(12) United States Patent
Greer

(10) Patent No.: US 6,285,959 B1
(45) Date of Patent: Sep. 4, 2001

(54) METHOD AND APPARATUS FOR CALIBRATING A NON-CONTACT GAUGING SENSOR WITH RESPECT TO AN EXTERNAL COORDINATE SYSTEM

(75) Inventor: Dale R. Greer, Novi, MI (US)

(73) Assignee: Perceptron, Inc., Plymouth, MI (US)

( * ) Notice: Subject to any disclaimer, the term of this patent is extended or adjusted under 35 U.S.C. 154(b) by 0 days.

(21) Appl. No.: 09/378,451

(22) Filed: Aug. 20, 1999

Related U.S. Application Data

(63) Continuation-in-part of application No. 09/073,205, filed on May 4, 1998, now Pat. No. 6,134,507, which is a continuation-in-part of application No. 09/030,439, filed on Feb. 25, 1998, now Pat. No. 6,128,585, which is a continuation of application No. 08/597,281, filed on Feb. 6, 1996, now Pat. No. 5,748,505.

(51) Int. Cl.[7] .................................................. G01B 11/03
(52) U.S. Cl. ............................ 702/95; 702/94; 702/104; 356/139.03; 356/375
(58) Field of Search ................................. 702/95, 33, 36, 702/40, 85, 94, 97, 104, 105, 150–153, 155, 158, 159, 182–185, FOR 103, FOR 104, FOR 123, FOR 124, FOR 131, FOR 134, FOR 135, FOR 136, FOR 144–FOR 147, FOR 156, FOR 157, FOR 159, FOR 160, FOR 170; 700/258, 259, 56–59, 192–194, 302, 303; 356/375, 376, 399–401, 139.03, 139.04, 139.09, 141.1, 152.1–151.3, 139.06, 4.01, 20–22, 141.4, 141.3, 243.1–243.6, 243.8; 382/104, 106, 154, 152, 151; 348/140, 139, 135, 137, 94, 95, 180, 190; 396/429, 431; 33/203.18, 203.19, 203.2, 288, 286, 608, 600, 502; 250/252.1 R, 252.1 A, 559, 29, 559.3, 559.31, 559.37, 559.46

(56) References Cited

U.S. PATENT DOCUMENTS

| | | | |
|---|---|---|---|
| 4,645,348 | 2/1987 | Dewat et al. | 356/326 |
| 4,841,460 | 6/1989 | Dewar et al. | 702/95 |
| 4,964,722 | 10/1990 | Schumacher | 356/139.03 |
| 5,090,803 | 2/1992 | Ames et al. | 356/139.03 |
| 5,295,073 | 3/1994 | Celette | 701/35 |
| 5,329,469 | 7/1994 | Watanabe | 700/259 |
| 5,388,059 | 2/1995 | DeMenthon | 702/153 |
| 5,532,816 | 7/1996 | Spann et al. | 356/139.09 |
| 5,552,883 | 9/1996 | Busch-Vishniac et al. | 356/139.03 |
| 5,570,190 | 10/1996 | Terawaki et al. | 356/400 |
| 5,661,667 | 8/1997 | Rueb et al. | 702/95 |
| 5,737,073 | * 4/1998 | Wente et al. | 356/139.09 |
| 5,757,499 | * 5/1998 | Eaton | 356/152.1 |
| 5,760,415 | * 6/1998 | Hauck et al. | 250/559.46 |
| 5,784,282 | * 7/1998 | Abitbol et al. | 700/259 |
| 5,801,834 | 9/1998 | Danielson et al. | 356/375 |

\* cited by examiner

*Primary Examiner*—Hal Wachsman
(74) *Attorney, Agent, or Firm*—Harness, Dickey & Pierce, P.L.C.

(57) ABSTRACT

The photogrammetric measurement system is positioned at a vantage point to detect and calibrate its reference frame to the external reference frame demarcated by light-reflecting retroreflective target dot on a spherical target. A tetrahedron framework with the spherical target mounted on one of the vertices serves as a reference target that is placed in front of the non-contact sensor to be calibrated. The photogrammetric measurement system reads and calibrates the position of the retroreflective target dot (and thus the tetrahedron) while the structured light of the sensor is projected onto the framework of the reference target. The structured light intersects with and reflects from the reference target, providing the non-contact sensor with positional and orientation data. This data is correlated to map the coordinate system of the non-contact sensor to the coordinate system of the external reference frame.

22 Claims, 4 Drawing Sheets

METHOD AND APPARATUS FOR CALIBRATING A NON-CONTACT GAUGING SENSOR WITH RESPECT TO AN EXTERNAL COORDINATE SYSTEM

CROSS-REFERENCE TO RELATED APPLICATION

This is a continuation-in-part of U.S. Pat. No. 6,134,507 entitled "Method and Apparatus for Calibrating a Non-Contact Gauging Sensor with Respect to an External Coordinate System", which issued on Oct. 17, 2000 from U.S. patent application Ser. No. 09/073,205 filed May 4, 1998; which is a continuation-in-part of U.S. Pat. No. 6,128,585 which issued on Oct. 3, 2000 from U.S. patent application Ser. No. 09/030,439 filed Feb. 25, 1998; which is a continuation of U.S. Pat. No. 5,748,505 which issued on May 5, 1998 from U.S. patent application Ser. No. 08/597,281 filed on Feb. 6, 1996, each of which are assigned to the assignee of the present invention.

BACKGROUND AND SUMMARY OF THE INVENTION

The present invention relates generally to noncontact gauging systems. More particularly, the invention relates to an apparatus system and method for calibrating noncontact gauging systems.

Demand for higher quality has pressed manufacturers of mass produced articles, such as automotive vehicles, to employ automated manufacturing techniques that were unheard of when assembly line manufacturing was first conceived. Today, robotic equipment is used to assemble, weld, finish, gauge and test manufactured articles with a much higher degree of quality and precision than has been heretofore possible. Computer-aided manufacturing techniques allow designers to graphically conceptualize and design a new product on a computer workstation and the automated manufacturing process ensures that the design is faithfully carried out precisely according to specification. Machine vision is a key part of today's manufacturing environment. Machine vision systems are used with robotics and computer-aided design systems to ensure high quality is achieved at the lowest practical cost.

Achieving high quality manufactured parts requires highly accurate, tightly calibrated machine vision sensors. Not only must a sensor have a suitable resolution to discern a manufactured feature of interest, the sensor must be accurately calibrated to a known frame of reference so that the feature of interest may be related to other features on the workpiece. Without accurate calibration, even the most sensitive, high resolution sensor will fail to produce high quality results.

In a typical manufacturing environment, there may be a plurality of different noncontact sensors, such as optical sensors, positioned at various predetermined locations within the workpiece manufacturing, gauging or testing station. The workpiece is placed at a predetermined, fixed location within the station, allowing various predetermined features of the workpiece to be examined by the sensors. Preferably, all of the sensors properly positioned and should be carefully calibrated with respect to some common fixed frame of reference, such as a common reference frame on the workpiece or at the workstation.

Keeping sensors properly positioned and calibrated is more easily said than done. In a typical manufacturing environment sensors and their associated mounting structures may get bumped or jarred, throwing the sensor out of alignment. Also, from time to time, a sensor needs to be replaced, almost certainly requiring reorienting and recalibrating. Quite simply, sensor positioning, alignment and calibration is a fact of life in the typical manufacturing plant.

The problem with sensor positioning, alignment and calibration is the time required. Invariably, the entire manufacturing assembly line for a given part must be shut down and the workstation cleared, so that the sensor may be positioned, aligned and recalibrated. In some instances this entails placing a highly accurate (and very expensive) full-scale model of the workpiece in the workstation. This independently measured part is sometimes called a master part. The master part is placed in careful registration with the external coordinate system of the workstation and then each sensor is trained on its assigned feature (such as a hole or edge). Once positioned, the sensors are locked into place and calibrated and the master part is removed. Only then can the assembly line be brought back online.

As an alternative to using a master part, it is possible to calibrate the gauging sensor by attaching a target to the sensor and illuminating the target using a plane of structured light produced by the sensor. A pair of optical sighting devices, theodolites, are placed at different vantage points within the workspace. The theodolites triangulate on the illuminated target to provide an independent reading of the position of the target. The theodolites are placed at carefully prescribed locations relative to the external reference frame. With the gauging sensor projecting structured light onto the target, the theodolites are manually aimed at the lighted targets and readings are taken. The respective readings of the theodolites and the gauging sensor are coordinated and transformed to calibrate the sensor relative to the external reference frame. It is a trial and error process. If the sensor needs to be reoriented (as is often the case), the theodolites must be manually retrained on the target after each sensor position adjustment. For more informaton on this calibration technique, see U.S. Pat. No. 4,841,460 to Dewar et al.

Whereas both of the aforementioned calibration techniques do work, there is considerable interest in a calibration technique that is quicker and easier to accomplish and that eliminates the need to rely on expensive master parts or difficult to use theodolite equipment. To this end, the present invention provides a calibration system that can be used in a matter of minutes, instead of hours, and without the need for precisely manufactured master parts or theodolite equipment. One of the major advantages of the invention is that it allows the calibration of a sensors to be checked or realigned between line shifts, without requiring the line to be shut down for an extended period.

The system employs a portable reference target that has a spherical target (having a retroreflective target dot) mounted on a tetrahedron framework at a known location with respect to the center of the tetrahedron framework. The retroreflective target dot is designed to reflect light from a photogrammetric measurement system comprised of two or more photogrammetric cameras. By placing the reference target within the field of observation of the photogrammetric system, the photogrammetric cameras are able to acquire the position of the retroreflective target dot and thereby acquire the position of the attached portable reference target.

The presently preferred portable reference target is a tetrahedron framework that provides at least three noncolinear and noncoplanar geometric structures (e.g., straight edges) that are illuminated by structured light emanating from the sensor. These noncolinear geometric features provide the sensor with unambiguous spatial data for measuring the spatial position and orientation of the target.

The system uses coordinate transformations for coordinating the sensor coordinate frame to an external reference frame. The system includes a coordinate transformation system for connecting the reading from the non-contact sensor and from the photogrammetric measurement system. The photogrammetric measurement system would be calibrated to the external reference frame using reference indicia and commercially available software. Using the tetrahedron with the structured light measurement, the transformation from sensor to tetrahedron space allows the identification of the retroreflective target dot in the sensor coordinates. Multiple samples are needed to define the orientation of the sensor. Establishing three or more non-collinear positions of the sensor allows the identification of the sensor coordinate frame with respect to reference coordinate frame of the photogrammetric measurement system in all six degrees of freedom (X, Y, Z, roll, pitch and yaw).

Using the calibration system of the invention, it is easy to calibrate a non-contact sensor. Initially, the retroreflective target dot is accurately located by the photogrammetric measurement system at several locations, such that the coordinate transformation system can be used to calibrate the system to the external reference frame. Next, the target is placed within the field of view of the sensor under calibration. The portable reference target is calibrated with respect to the reference frame of the photogrammetric measurement system. The sensor is then calibrated by projecting structured light from the non-contact sensor onto the portable reference target. The structured light intersects the target, producing reflected light patterns at the edges of the tetrahedron target that are then read by the non-contact sensor. The coordinate transformation system then performs the appropriate coordinate transformation to map the reading of the non-contact sensor back to the external reference frame.

The entire calibration sequence can be performed quite quickly. The photogrammetric cameras and portable reference targets are both lightweight and easily positioned. Moreover, the entire calibration sequence may be performed rapidly. In most instances, all the calibration technician must do is position the reference target at several locations while the photogrammetric measurement system acquires and stores its position, as well as place the portable reference target in front of the non-contact sensor and then allow the system to do the rest.

For a more complete understanding of the invention, its objects and advantages, reference may be had to the following specification and to the accompanying drawings.

DESCRIPTION OF THE PREFERRED EMBODIMENT

Figure 1:
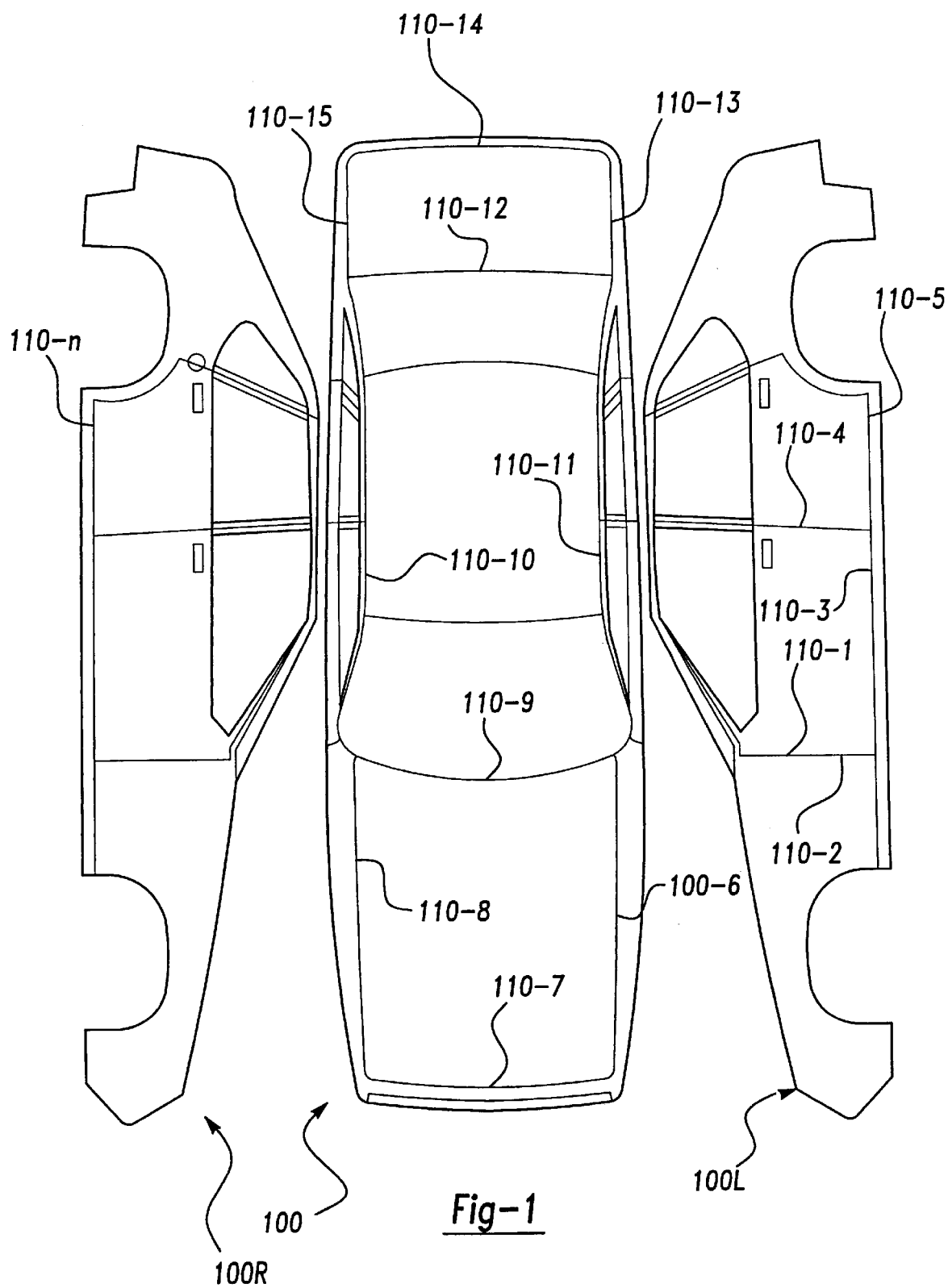
FIG. 1 is a simultaneous top and side view of a portion of an automotive vehicle body, showing typical points of interest which would be placed in the field of view of a plurality of noncontact sensors at a gauging station.

With reference to FIG. 1, there is shown a typical automotive vehicle body portion which, prior to its assembly with other of the vehicle components, would require gauging of certain key points. Such miscellaneous points of interest are shown on workpiece 100 of FIG. 1 as points 110-1 through 110-n. The left side 100L of the vehicle body and the right side 100R of the vehicle body are shown in an "unfolded" view for convenience in FIG. 1. Typical usages of the points or the manner in which they are selected would be dictated, for example, by the ensuing assembly process to take place with respect to the workpiece 100. For example, assume that the hood has not yet been assembled over the hood cavity at the front of the vehicle. Then measurements about the periphery of the hood cavity, such as at points 110-6, 110-7, 110-8 and 110-9 could be made to determine whether the ensuing assembly of the hood lid to the vehicle body can be performed with an acceptable fit between the parts to be assembled.

While there are many sensor arrangements known, including the optical arrangement disclosed in U.S. Pat. No. 4,645,348 to Dewar et al., assigned to the assignee of the present invention, it has been time consuming to calibrate the sensor readings at all the desired points of interest about a large workpiece with respect to any desired external reference frame. The present invention addresses the need for faster calibration.

Figure 2:
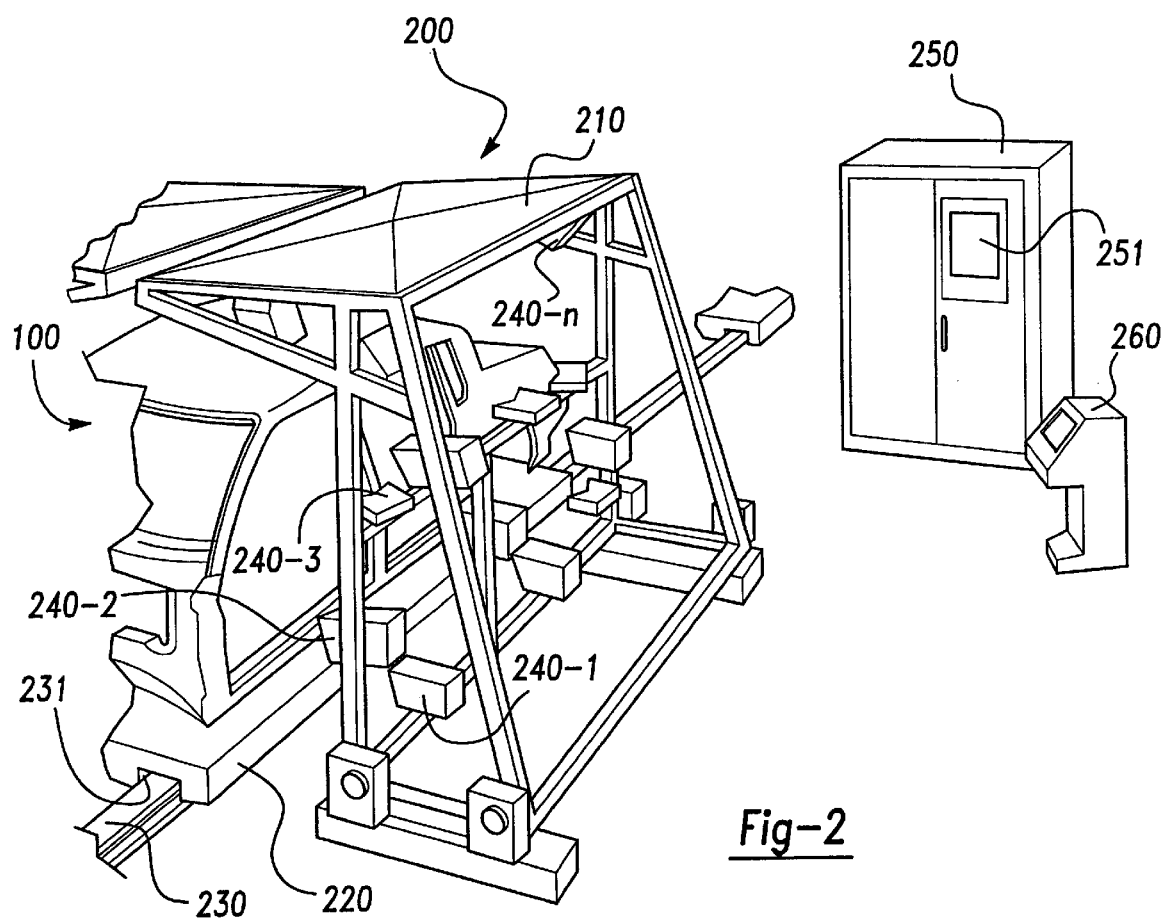
FIG. 2 is a perspective view of a typical gauging station on an automotive assembly line, including a plurality of noncontact sensors to be calibrated in accordance with the principles of the invention.

A typical gauging station for an automotive vehicle part as shown in FIG. 1 could take the form shown in FIG. 2. Workpieces to be gauged at gauging station 200 rest on transporting pallets 220, which are moved along an assembly line via pallet guides 230 that pass through guide channels 231 in the pallet. At the gauging station 200, a sensor mounting frame 210 (only one half of which is shown in perspective in FIG. 2) surrounds the workpiece 100 to be gauged and provides a plurality of mounting positions for a series of optical non-contact gauging sensors 240-1 through 240-n, each designed in accordance with the disclosure of U.S. Pat. No. 4,645,348, for example. Communication cables which are not specifically shown in FIG. 2 for clarity, couple the sensors 240 to a machine vision computer 250 which includes a CRT or cathode ray tube display 251. Optionally provided with a typical machine vision computer is a printer 260. The apparatus and method of this invention may be used to effect calibration of each of the sensors 240 with respect to a predetermined external coordinate system or reference frame, associated, for example, with the workpiece 100 to be measured or with respect to an external reference frame associated with the gauging station itself.

Figure 3:
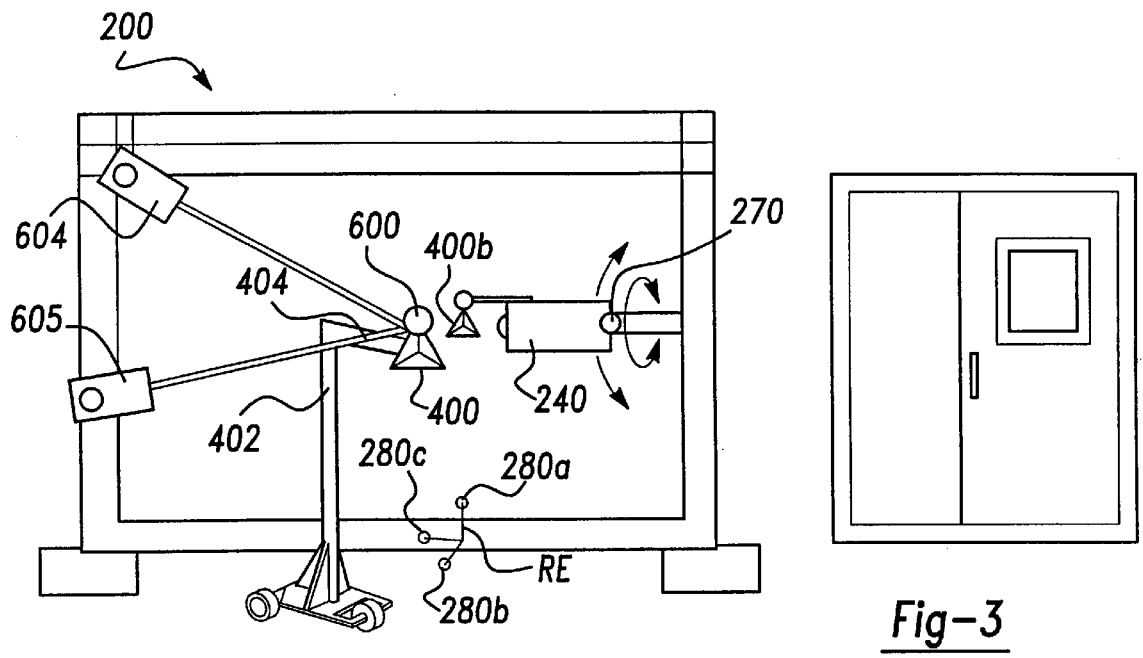
FIG. 3 is a side elevational view of the calibration system of the present invention.

Referring to FIG. 3, gauging station 200 is shown in conjunction with the calibration system of the invention. To simplify the illustration, only one non-contact sensor 240 has been illustrated. The non-contact sensor 240 is adjustably secured to the gauging station frame as at 270, allowing the sensor to be positionally adjusted and then tightened or locked into place once it is properly aimed at the point in space (x, y, z) where the workpiece feature of interest will be located and is properly oriented at the correct attitude (pitch, yaw and roll).

The calibration system includes at least two photogrammetric cameras 604 and 605 that may be positioned at a convenient vantage point, such as above and/or adjacent to the space that is occupied by the workpiece in the gauging station. Alternatively, the photogrammetric cameras can each be temporarily positioned in a fixed location, such as by hanging it from the gauging station frame or mounting it on a movable stand, allowing them to be moved from location to location throughout the manufacturing facility.

The calibration system further includes a portable reference target 400. The presently preferred reference target is a lightweight, readily transportable tetrahedron framework. The reference target 400 can be mounted on any suitable fixture, allowing it to be positioned in front of the noncontact sensor 240 for the calibration operation. In FIG. 3, a first reference target 400 is shown attached to a simple tripod stand 402 with cantilevered arm 404. A second reference target 400b is attached by bracket directly to the sensor 240. These are just two examples, as other supporting structures may be used.

Figure 4:
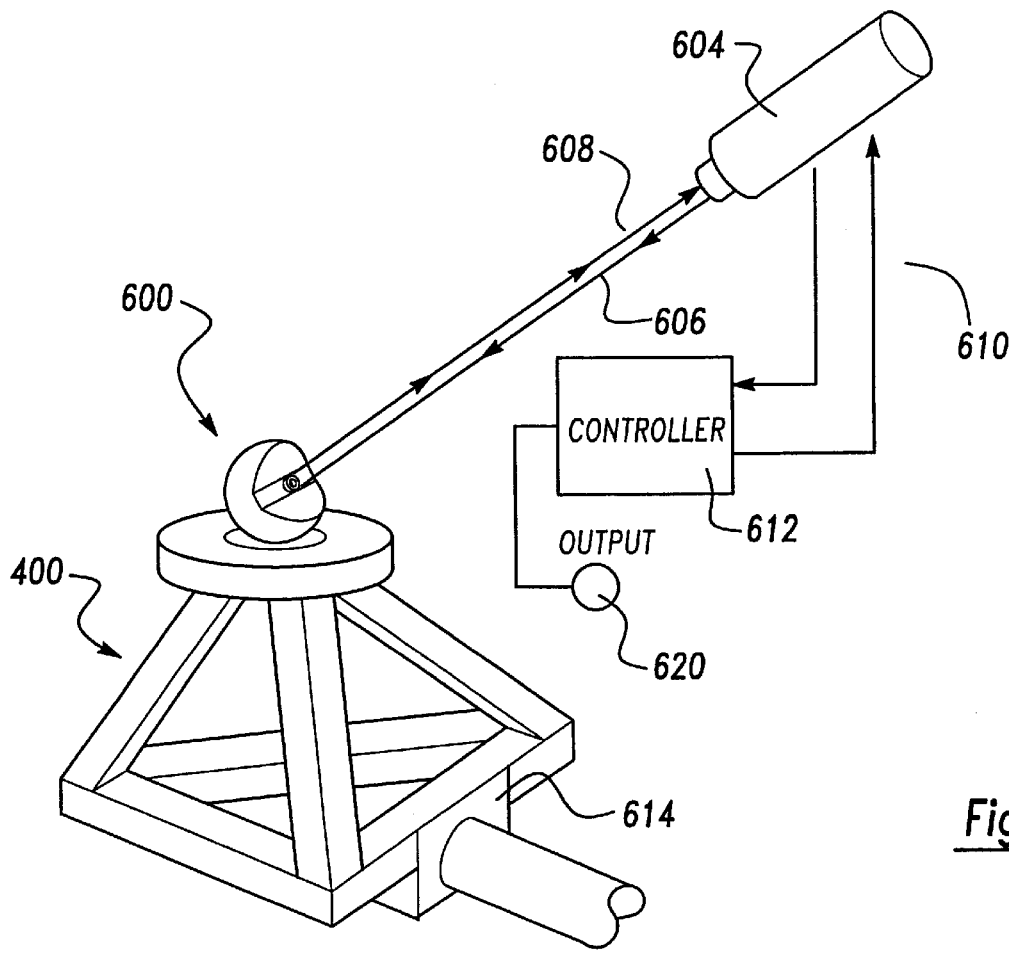
FIG. 4 is perspective view of an alternate embodiment of the present invention employing a photogrammetric measurement system.
Figure 5A:
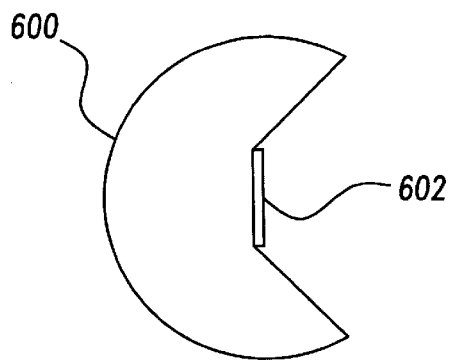
FIGS. 5A and 5B are detailed views of the spherical target, showing the retroreflective target dot.
Figure 5B:
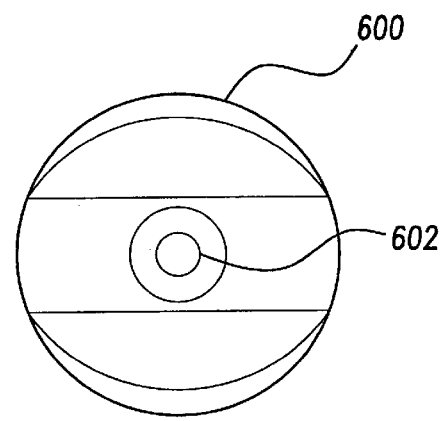

Referring to FIG. 4, the tetrahedron framework 400 is outfitted with a spherical target 600, preferably by affixing it to one of the vertices of the tetrahedron. The spherical target 600, also shown in FIGS. 5A and 5B, includes a retroreflective target dot 602 positioned on a centerline of the spherical target 600. The retroreflective target dot 602 has the reflective property of reflecting an incoming light ray back to its source. An exemplary spherical target is the Theodolite 1.5 Sphere that is manufactured by Hubbs Machine & Manufacturing, Inc. of Cedar Hill, Mo., except that the target will be modified to have a 0.2" (5.08 mm) retroreflective target dot in place of the existing theodolite target dot.

Referring to FIG. 4, a photogrammetric camera 604 emits an outgoing laser beam 606 and detects an incoming laser beam 608. The photogrammetric camera 604 operates under conventional photogrammetry techniques. That is, retroreflective markers are placed on the measurement object. The markers are then illuminated by visible or infrared light from a camera. The light is emitted in the form of continuous waves or short pulses (e.g., frequencies up to 1000 Hz) that are produced by an integrated LED array within the camera. The light is reflected by the markers, as bright light spots, back to a motion capture unit within the camera. The light spots are analyzed, such that their position and sizes are calculated by the camera, thereby determining the position of the markers. An exemplary photogrammetric camera is the ProReflex Motion Capture System manufactured by Qualisys AB of Savedalen, Sweden or the Metronor System manufactured by Metronor ASA of Nesbru, Norway. In the present invention, as long as the reference target 400 is within the field of view of the photogrammetric camera 604, the photogrammetric camera 604 will provide an accurate determination of the position of the reference target 400. The spherical target 600 is preferably mounted on a vertex of the tetrahedron framework, and the framework is provided with a mounting fixture 614 for attachment to a tripod stand, anchoring point or directly to the non-contact sensor's structure, or to some other suitable structure, such as a tripod stand 402 (see FIG. 3). By securing the spherical target 600 to the tetrahedron and then calibrating the target relative to the fixture 614, the retroreflective target dot of the spherical target 600 may be geometrically calibrated in terms of a reference frame for the framework. This calibration may be done by moving the assembly to three or four different locations within a previously calibrated structured light sensor measuring zone. Ideally, this calibration should be done using a sufficient number of measurements to ensure that the X, Y, Z offset between the retroreflective target dot and the mounting fixture 614 is known.

In use, the photogrammetric measurement system embodiment can be used to link the external reference frame (typically that of the user) with the reference frame of the structured light non-contact sensor, using the retroreflective target dot of the spherical target and the tetrahedron framework as the intermediary link. First, each photogrammetric camera is calibrated to the external reference frame using reference indicia and commercially available devices and software. External reference frame $R_e$ has been diagrammatically included in FIG. 3 as a plurality of noncolinear reference indicia 280a, 280b and 280c. Next, the tetrahedron framework is intersected by a plane of structured light (from the sensor), thereby establishing a relationship between the tetrahedron and the non-contact sensor. By determining the position of the retroreflective target dot, the photogrammetric camera establishes a relationship between the tetrahedron framework and the photogrammetric camera. A signal indicative of the distance between the retroreflective target dot of the spherical target and the photogrammetric camera is passed to a controller 612.

The photogrammetric camera provides a partial link to the external reference frame or user reference frame. It will generate the X, Y, Z position of the retroreflective target dot as provided at output 620 of FIG. 4. In order to acquire all six degrees-of-freedom (X, Y, Z as well as roll, pitch, yaw) the target may be moved to three or more locations while acquiring data. Preferably, four or more non-collinear location points are used. Once this has been done the data may be used to triangulate onto a six degree-of-freedom location and orientation.

Figure 6:
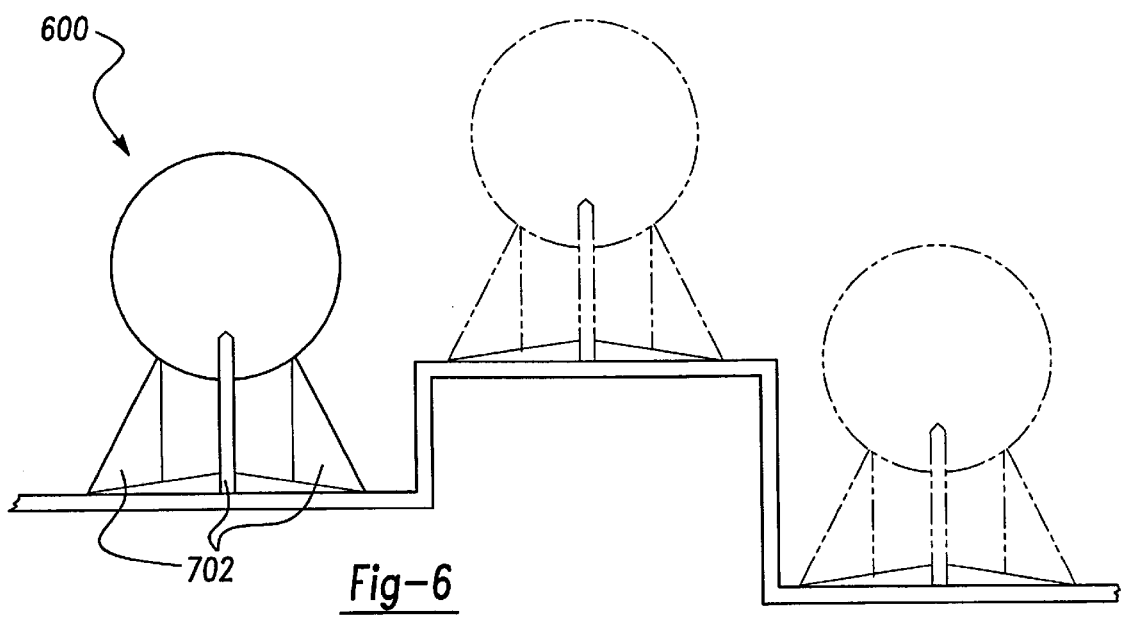
FIG. 6 is a home nest calibration apparatus used to zero the retroreflective target dot of the spherical target.

The photogrammetric camera can be conveniently calibrated (to zero the retroreflective target dot of the spherical target) using a "home nest" calibration fixture. Shown in FIG. 6, the home nest employs a plurality of nest cites (three are shown in FIG. 6) each having a three point spherical support structure 702 that will hold the spherical target 600. Preferably, the three supports 702 are magnetized to tightly hold the spherical target 600. Each of the nest cites has a precise location relative to the external coordinate system.

The spherical target is moved manually from nest cite to nest cite, all the while being careful to ensure that it is within the field of view of the photogrammetric measurement system. The location data an output 620 (FIG. 4) are noted as the spherical targets are held in each nest. Each photogrammetric camera requires calibration before the above-described process for calibrating the non-contact sensor can be performed.

While the invention has been described in its presently preferred form, it will be understood that the invention is capable of modification without departing from the spirit of the invention as set forth in the appended claims.

What is claimed is:

1. A sensor calibration system for calibrating a non-contact sensor with respect to an external reference frame, the non-contact sensor of the type having a sensing zone associated with a sensor reference frame comprising:

a reference indicia disposed in fixed relation to said external reference frame;

a photogrammetric measurement system having a calibration field of observation associated with a photogrammetric reference frame, said photogrammetric measurement system being positionable at a vantage point such that said reference indicia is within the calibration field of observation;

a tetrahedron framework associated with a tetrahedron reference frame for placement within the calibration field of observation of said photogrammetric measurement system and within the sensing zone of said sensor;

a coordinate transformation system being adapted for coupling to said photogrammetric measurement system for collecting data from said reference indicia and for establishing a first relationship between the photogrammetric reference frame and the external reference frame;

said coordinate transformation system further being adapted for collecting data from the non-contact sensor when said tetrahedron framework is in at least three noncolinear positions, for transforming collected data from the non-contact sensor to said tetrahedron reference frame and for translating data from said tetrahedron reference frame to said photogrammetric reference frame, establishing a second relationship between the photogrammetric reference frame and the non-contact sensor reference frame; and said coordinate transformation system determining a third relationship between the external reference frame and the sensor reference frame, and calibrating said non-contact sensor with respect to said external reference frame based upon said first, second, and third relationships.

2. The sensor calibration system of claim 1 wherein said photogrammetric measurement system further includes at least two photogrammetric cameras.

3. The sensor calibration system of claim 1 further comprises a spherical target affixed to said tetrahedron framework, said spherical target having a retroreflective target dot on a centerline of said spherical target.

4. The sensor calibration system of claim 1 wherein said non-contact sensor is an optical sensor.

5. The sensor calibration system of claim 1 wherein said non-contact sensor is an active optical sensor that emits structured light and detects reflected light.

6. The sensor calibration system of claim 1 further comprising a gauging station for gauging a work piece, said non-contact sensor being securely connected to said gauging station for determining measurement information of said work piece.

7. The sensor calibration system of claim 6 wherein said work piece is a motor vehicle.

8. The sensor calibration system of claim 1 wherein the sensor calibration system operates within a motor vehicle manufacturing system.

9. A sensor calibration system for calibrating a non-contact sensor with respect to an external reference frame, the non-contact sensor of the type having a sensing zone associated with a sensor reference frame comprising:

a reference indicia disposed in fixed relation to said external reference frame;

at least two photogrammetric cameras having a calibration field of observation associated with a photogrammetric reference frame, said at least two photogrammetric cameras being positionable at two or more vantage points such that said reference indicia is within the calibration field of observation;

a reference target for placement within the observation field of said at least two photogrammetric cameras and within the sensing zone of said non-contact sensor;

a coordinate transformation system being adapted for coupling to said at least two photogrammetric cameras for collecting data from said reference indicia and for establishing a first relationship between the photogrammetric reference frame and the external reference frame;

said coordinate transformation system further being adapted for coupling to said at least two photogrammetric cameras and to said non-contact sensor for collecting data from the reference target and for establishing a second relationship between the photogrammetric reference frame and the sensor reference frame; and said coordinate transformation system determining a third relationship between the external reference frame and the non-contact sensor reference frame, and calibrating said non-contact sensor with respect to said external reference frame based upon said first, second, and third relationships.

10. The sensor calibration system of claim 9 wherein said reference target is further defined as a spherical target affixed to a tetrahedron framework.

11. The sensor calibration system of claim 10 wherein said spherical target further includes a retroreflective target dot on a centerline of said spherical target.

12. The sensor calibration system of claim 11 wherein said at least two photogrammetric cameras tracks said retroreflective target dot in at least three noncolinear location points in order to define said second relationship between the photogrammetric reference frame and the sensor reference frame.

13. A method for calibrating a non-contact sensor with respect to an external reference frame using a photogrammetric measurement system, the photogrammetric measurement system having a fixed position with respect to the external reference frame according to a first relationship, comprising the steps of:

providing a reference target for placement within the observation field of said photogrammetric measurement system and within a sensing zone of said non-contact sensor, where said reference target is further defined as a spherical target affixed to a tetrahedron framework;

determining a second relationship between said reference target and said external reference frame through use of the photogrammetric measurement system and said reference target, said second relationship defining the position of said reference target with respect to the external reference frame;

determining a third relationship between said reference target and said non-contact sensor through use of said non-contact sensor and said reference target, said third relationship defining the position of said non-contact sensor with respect to the position of said reference target; and calibrating said non-contact sensor with respect to said external reference frame based upon said first, second, and third relationships.

14. The sensor calibration method of claim 13 wherein said second relationship defines the location and the orientation of the reference target with respect to the external reference frame.

15. The sensor calibration method of claim 14 wherein six degrees of freedom are used for defining said location and orientation of the reference target.

16. The sensor calibration method of claim 13 wherein said third relationship defines the location and the orientation of the reference target with respect to the location and orientation of the non-contact sensor.

17. The sensor calibration method of claim 16 wherein six degrees of freedom are used for defining the locations and the orientations of said reference target and of said non-contact sensor.

18. The sensor calibration method of claim 13 wherein the step of determining the second relationship further comprises:

placing said reference target within the observation field of said photogrammetric measurement system; and determining the position of said reference target with respect to said external reference frame using said photogrammetric measurement system.

19. The sensor calibration method of claim 13 wherein the step of determining the third relationship further comprises:

placing said reference target within the field of view of said feature sensor;

projecting structured light from said non-contact sensor upon said reference target; and determining the position of said reference target with respect to said non-contact sensor based upon the structured light reflected to said non-contact sensor from said reference target.

20. The sensor calibration method of claim 13 wherein said photogrammetric measurement system is further defined as at least two photogrammetric cameras being positionable at two or more vantage points such that said reference target is within the observation field of said photogrammetric cameras.

21. The sensor calibration method of claim 13 wherein said spherical target further includes a retroreflective target dot on a centerline of said spherical target.

22. The sensor calibration method of claim 21 therein said photogrammetric measurement system tracks said retroreflective target dot in at least three noncolinear location points in order to define said second relationship between said reference target and the external reference frame.

* * * * *